3,545,260
Patented Dec. 8, 1970

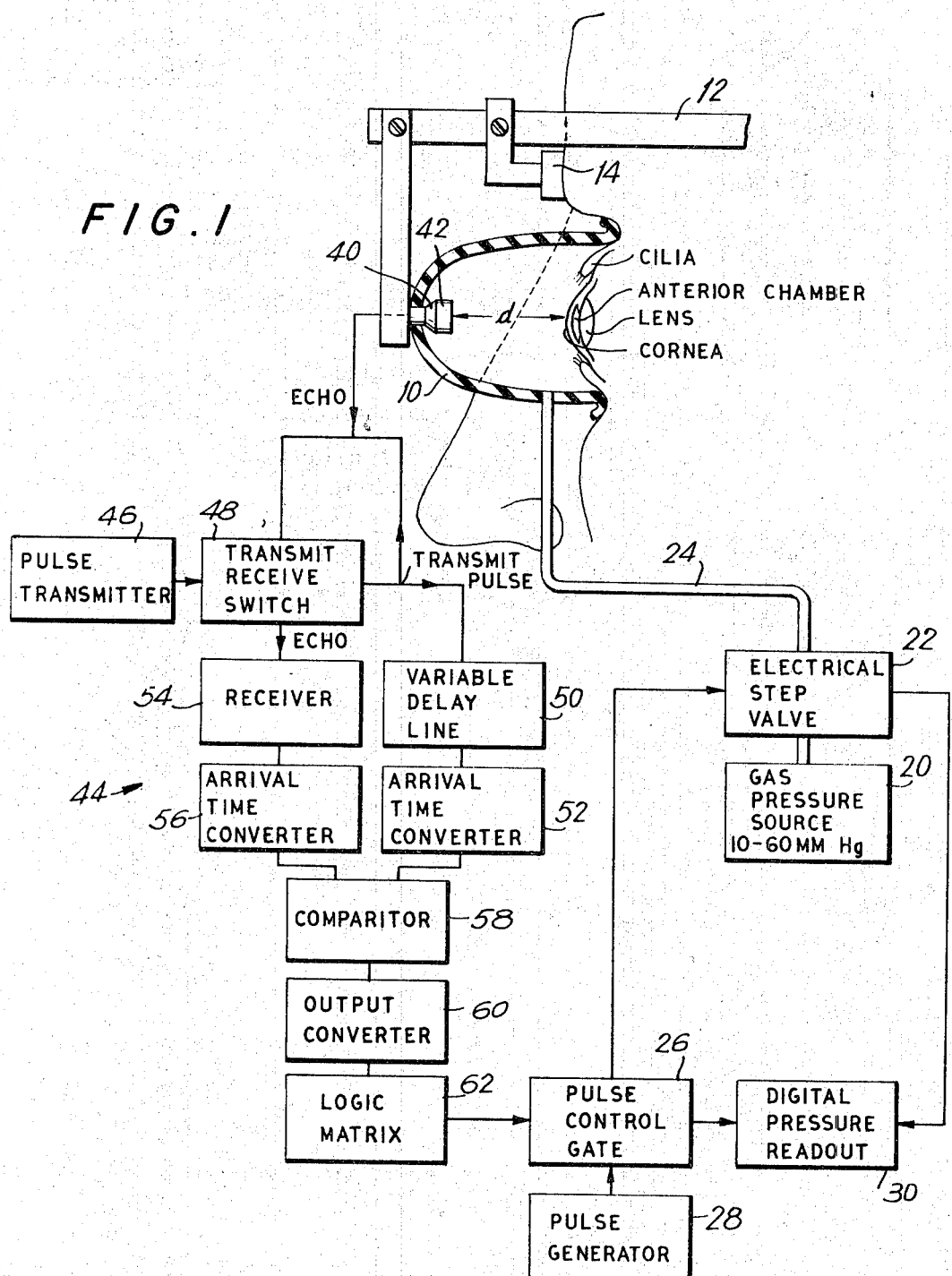

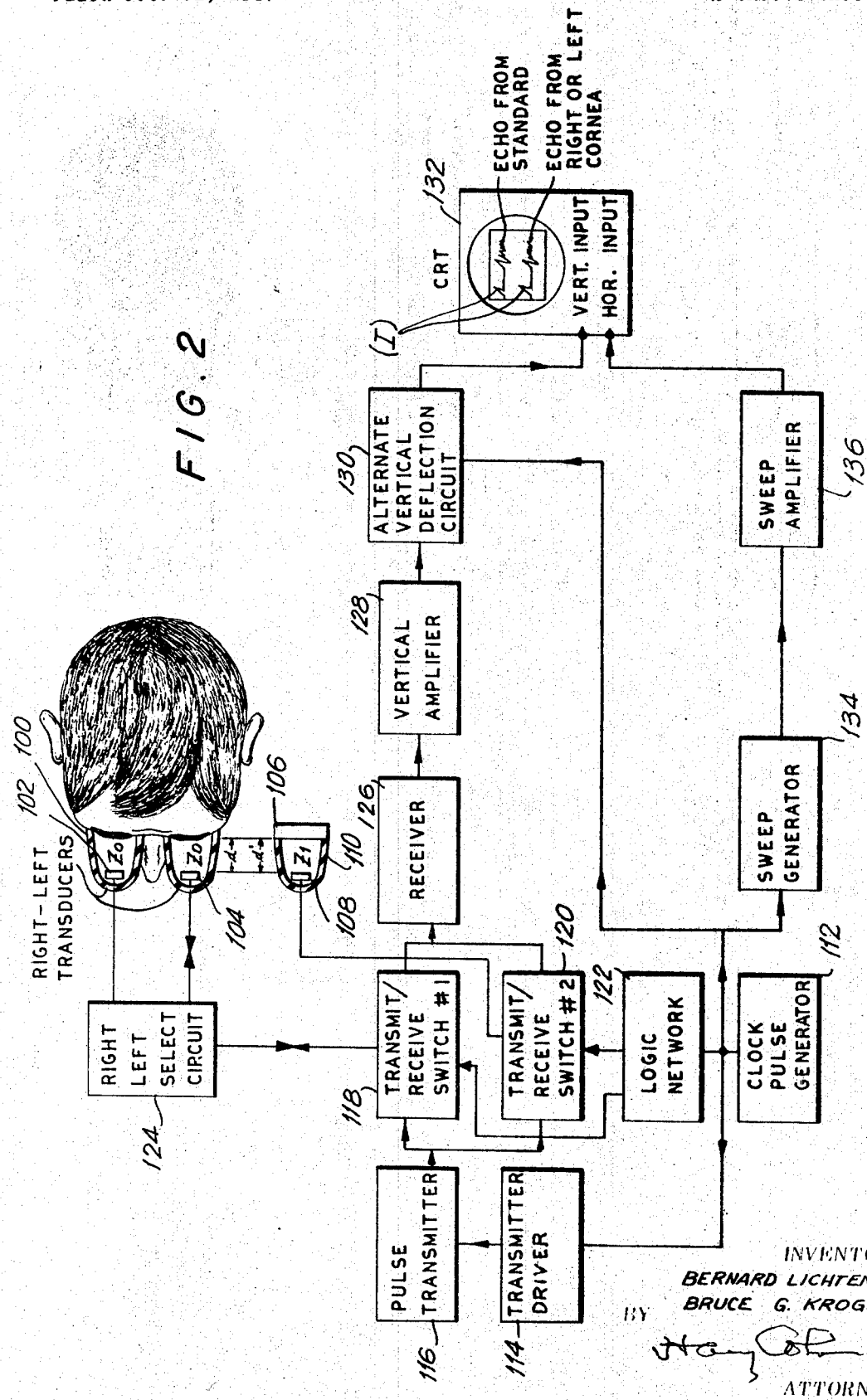

3,545,260
MEANS AND METHOD FOR DETECTION OF GLAUCOMA
Bernard Lichtenstein, Tustin, Calif., and Bruce G. Kroger, Rye, N.Y., assignors to Technicon Corporation, Ardsley, N.Y., a corporation of New York
Filed Oct. 31, 1967, Ser. No. 679,379
Int. Cl. A61b 3/16
U.S. Cl. 73—80                                            10 Claims

ABSTRACT OF THE DISCLOSURE

A system for measuring the intraocular pressure of an eye utilizes a cup-shaped member sealed over the front part of the eye. Gas pressure is increased within the cup-shaped member to apply pressure to the cornea of the eye, until a deflection in the curvature of the cornea is detected by an acoustic pulse transmitting and echo receiving system based on a transponder within the cup-shaped member.

Another system for measuring the intraocular pressure of an eye, is based on such pressure being responsive to the acoustic impedance of the cornea. The acoustic impedance of the cornea is measured by comparing the energy it reflects with the energy reflected by a calibrated, variable impedance member.

BACKGROUND OF THE INVENTION

Field of the invention

This invention relates to the measurement of pressure within a closed container, and particularly to the measurement of pressure within an invertebrate eye.

Description of the prior art

The determination of the liquid pressure in the anterior eye chamber (intraocular pressure) is of great interest in the diagnosis of glaucoma. While the causes of glaucoma are not completely understood, its diagnosis and treatment are fairly well understood. Glaucoma is a malfunction of the eye mechanism which results in impairment of the circulation of the aqueous humor through the eye, and thereby leads to a build-up of liquid pressure within the eye. This pressure build-up, if permitted to persist, can damage the optic cup and the retina, eventuating in blindness.

The relationship between the pressures in the normal and in the glaucomatous eye has been known since 1830. The formation of the aqueous humor and its circulation within the eye was subsequently theorized and proven in 1837 by the injection of a dilute dye into the anterior chamber of the eye and then noting the presence of this dye in the episcleral vessels.

Various methods and apparatuses have been developed to accomplish "tonometry" or "the observation and the recording of pressure changes in any physical or biological system," as discussed by P. C. Kronfield in Transactions of the American Academy of Ophthalmology and Itolaryngology, 133: March/April 1961. Subsequently the "massage effect" was discovered, wherein external pressure applied to the eye causes a drop in intraocular pressure. J. S. Friedenwald in I, Am. J. Ophthalmology 20:985 1937; II, ibid, 22:375 1939, published a table relating the volume of corneal indentation and intraocular pressure to the plunger loads and scale readings of the "Schiotz" tonometer. There are several types of tonometers in common use. They are the Schiotz, the Gradle, the McLean, the Bailliart, the Souter and the Harrington. All except the Bailliart are used in a similar manner in that the tonometer is hand supported and the footplate, which is weighted, is allowed to contact the cornea. The Bailliart tonometer footplate contacts the temporal sclera about 5 mm. from the limbus, instead of the cornea. In use, contact is made to correspond to an initial Schiotz scale reading and the subsequent fall of the plunger is followed by the pivoted lever and measured by the deflection of the lever against an upper scale. During this measurement the subject must be in a reclining position with the cornea anesthetized.

Friedenwald's tables relate the initial tonometer reading to steady state or intraocular pressure ($P_o$) by the following equation:

$$\Delta V = \frac{1}{K_t} \log \frac{P_t}{P_o} \quad (1)$$

where $\Delta V$ is the net ocular displacement; $K_t$ is the coefficient of ocular rigidity with respect to ocular distortion; and $P_t$ is the intraocular pressure as a result of applying the tonometer.

The values of $\Delta V$ are determined to be a function of the tonometer depth. $P_t$ is calculated from the calibrated plunger weight and diameter. There is no single intraocular pressure level that demarks a healthy eye from a glaucomatous eye. The normal variations of intraocular pressure are between 16 and 25 mm. Hg. The average intraocular pressure reading taken in 1,000 eyes of patients over 30 years of age was reported as 19.63 mm. Hg by Berens and Zuckerman in Diagnostic Examination of the Eye, 1946. This changes with age, being lowest between 30 and 40 years, highest between 60 and 70 years, and decreasing after 70. Intraocular pressure above 25 mm. Hg is considered suspicious, and above 28, pathologic. G. W. Morton demonstrated a method for measuring the "Coeffcient of Aqueous Humor Outflow" or (C) in AMA Archives of Ophthalmology 46:113, 1951. This coefficient, with the intraocular pressure, enables the calculation of the total flow of aqueous humor. The assumption is made that the change in ocular volume ($\Delta V$) is equal to the volume of fluid expressed from the eye, and that the eye acts as a linear mechanical system. Thus, where ($\Delta P$) is the change in pressur deuring tonometry, as measured by a continuous reading tonometer over a fixed interval of time (T), and ($P_o$) is the initial intraocular pressure, then $$\frac{\Delta T}{T} \sim \Delta P$$

or $$\frac{\Delta V}{T} = C \Delta P \quad (2)$$

and $$C = \frac{V}{T(\Delta P)} \quad (3)$$

C being the coefficient of facility of aqueous outflow. Since all terms on the right of equation are measured by the continuous reading tonometer, C can be calculated.

Since Morton's work in 1950, a great many measurements of C have been made which have indicated the diagnostic value of the coefficient of facility of aqueous humor outflow. The glaucomatous eye tends to have a low C and a high $P_o$. Values of C greater than 0.18 are normal, values between 0.13 and 0.18 are suspect, and values less than 0.13 are probably glaucoma. For subjects in the 0.13 to 0.18 range, the ratio of intraocular pressure to coefficient of facility of outflow ($P_o/C$) is useful, setting the norm at a value of 100. $P_o/C$ values of greater than 100 are considered normal, and less than 100 are suspect.

Tabulations of C and $P_o$ require a knowledge of the coefficient of ocular rigidity ($K_t$). The values used are empirically determined mean, and can result in errors in C and $P_o$ when eyes with abnormal ocular rigidity are examined. In view of this, it is desirable to measure $P_0$ while introducing a minimum of surface and fluid distortion to the eye. In 1956, H. Goldman devised the Applanation Tonometer, Trans. Ophthal. Soc. U.K. 79:477, 1959, wherein pressure application is carefully controlled and limited to the amount required to just flatten a small surface of the cornea with a 3.06 mm. diameter footplate, which creates approximately a 200 micrometer corneal indentation. Values of $P_o$ obtained this way have proven more reliable, and the combination of values of $P_o$ obtained by the applanation, and C obtained by tonography are the most reliable glaucoma diagnostic tools commonly available.

SUMMARY OF THE INVENTION

Objects of this invention are to provide a method and apparatus for tonometry utilizing a scleral distortion much smaller than that previously feasible, e.g. 2.5 micrometer indentation, and to make possible a measurement of $P_o$ with more accuracy and less effect on the eye. Other objects are to provide a technique which does not require a topical anesthetic, nor dyes applied to the eye; to allow measurement in complete comfort to the subject without rigid mechanical contact with the cornea; and to provide a measurement which can be made simply, swiftly, and to both eyes concurrently if desired.

One principle of the invention is a system utilizing a source of external fluid pressure to incrementally increase the external pressure on the eye and to ultrasonically determine the initial tissue displacement due to such applied external pressure being incrementally greater than the intraocular pressure.

Another principle of the invention is a system wherein the acoustic impedance of the eye is measured to determine the intraocular pressure of the eye by ensonifying and comparing the eye acoustic impedance with a known acoustic impedance.

BRIEF DESCRIPTION OF THE DRAWING

These and other objects, features and advantages of the invention will be apparent from the following specification thereof, taken in conjunction with the accompanying drawing, in which:

FIG. 1 is a block diagram of an apparatus for measuring the intraocular pressure by acoustically sensing the displacement of the cornea; and FIG. 2 is a block diagram of an apparatus for measuring the intraocular pressure by measuring the acoustic impedance of the anterior chamber.

DESCRIPTION OF THE PREFERRED EMBODIMENT

The apparatus of FIG. 1 is used to apply increasing pressure to the cornea, and to sense the pressure at which the initial displacement of the cornea occurs. This external pressure will be only incrementally greater than the initial intraocular pressure.

The subject presses both eyes against two respective soft rubber pressure retaining cups 10 which are fixed to a fixed support assembly 12, until his forehead abuts a forehead stop 14 which is also fixed to the assembly 12. While only one eye, cup and circuitry are herein shown and described, two such cups and circuitry may be provided, so that both eyes may be concurrently examined.

A gas pressure source 20 providing inert gas under a pressure range from 10 through 60 mm. Hg is coupled through an electrically operated step valve 22 and a conduit 24 to the respective cup 10. The step valve 22 is coupled through a pressure control gate 26 to a pulse generator 28. The gate 26 is normally conducting and passes pulses from the generator 28 to the valve 22 to admit more gas from the source 20 into the cup 10, thereby to increase the gas pressure within the cup and bearing against the cornea. A gas pressure sensor and readout 30 is coupled to the valve 22, conduit 24, cup 10 system to measure and indicate the gas pressure in the cup 10. The gate 26 is also coupled to the readout 30, and is adapted to actuate the readout to indicate, as by a digital printout, the gas pressure present in the cup when the gate becomes nonconducting.

An electrical-acoustic transducer 40, such as a piezoelectric transducer, is mounted within the base of the cup. An impedance matching material 42 is disposed between the transducer face and the gas interface to maximize the energy transfer therebetween.

The transducer is coupled to a transmit-receive system 44, which is used to continuously measure the distance between the transducer and the front face of the cornea. A pulse transmitter 46 is periodically coupled by a transmit-receive switch 48 to the transducer for the transmission of an acoustic pulse towards the eye. The switch 48 also concurrently couples the transmitter to a variable delay line 50 which, in turn, is coupled to a pulse arrival time converter 52. After a pulse has been transmitted, the switch 48 shifts to its receive mode to decouple the transmitter 46 and the variable delay line 50, and to couple a receiver 54 to the transducer 40. The acoustic echo from the front face of the cornea is received by the transducer, and a pulse is coupled through the receiver to a pulse arrival time converter 56. The variable delay line is initially adjusted to make its pulse propagation time equal to the time required for the acoustic pulse to make the round trip from the transducer to the cornea and return. Thus, both pulse arrival time converters 52 and 56 should indicate the same times. The output signals of the converters 52 and 56 are coupled to a comparator 58 whose output signal is fed to a converter 60, which in turn, feeds a logic matrix 62. So long as the arrival times indicated by the converters 52 and 56 are substantially identical, the logic matrix enables the gate 26 to increase the gas pressure in the cup 10. This pressure build up continues until the arrival time indicated by the converter 56 lags the time indicated by the converter 52, indicating that the path length $d$ has increased. This change is recognized by the comparator 58, and this information is fed to the logic matrix 62 to deactuate the gate 26, to halt the flow of gas, to stop the pressure build up, and to indicate the final gas pressure. The system is automatically reset when the pressure is released.

The accuracy of the system of FIG. 1 depends on the distance resolution ability of the ultrasonic system. This resolution depends upon pulse width, rise time, and sonic beam width. As a first approximation, the ratio of pulse width ($T_p$) to total travel time ($2T_d$), is made equal to the ratio of the deformation of the cornea (E) to $2d$, or $$\frac{T_p}{2T_d} = \frac{E}{2d}$$

the $$T_p = \frac{E}{d} T_d$$

Introducing real dimensions, $d = 20$ mm. and $E = 0.1$ mm. Then, since $T_d =$ the travel time of sound in 20 mm. of air $= 82$ microseconds, $$T_p = \frac{0.1}{20}(82) = 400 \text{ nanoseconds.}$$

By the use of a reference path which is adjustable to $d$, and an electronic comparator, as described by Mullins and Guntheroth in Proceedings of the 16th Annual Conference on Engineering in Medicine and Biology, 146 (1963), a resolution of 10 nanoseconds ($10^{-8}$ seconds) can be achieved. This permits the detection of a change in distortion of the cornea of 2.5 micrometers.

If it is desired to insure that there is no retrograde movement of the whole eye in its orbit under the influence of the gas pressure in the cup, then a second and a third acoustic beam can be provided, which would straddle the center beam above described which is pointed at the cornea, and would be pointed at the sclera. These two straddling beams would only measure orbital displacement and their signal would be subtracted from the output of the center beam in the determination of the distance d.

DESCRIPTION OF A SECOND EMBODIMENT

Radiated energy, of any type, be it acoustic, ultrasonic, or electromagnetic, will experience reflection and refraction at boundaries of change in the propagating medium. In the case of a propagated acoustic wave, the amount of reflected energy is a function of acoustic impedance mismatch at the boundary. The relative intensity of reflected to propagated energy for normal incidence is defined by:

$$I_r = \left[\frac{Z_1 - Z_2}{Z_1 + Z_2}\right]^2$$

where:

$I_r$=intensity reflection coefficient,
$Z_1$=acoustic impedance of propagation source,
$Z_2$=acoustic impedance of propagation incidence.

Echo intensity is also a function of the angle of the incident energy with respect to the incident boundary and the distance from the transducer to that boundary. The echo intensity is very sensitive to the angle of incidence, changing as much as 40% for a one degree inclination change at 18 mcs. Changing the transducer-to-boundary spacing by three wavelengths at 18 mcs. can produce a 20% variation.

If the spacing is held constant and the angle of incidence is carefully controlled, then the coefficient of reflection varies in response to the acoustic mismatch. Then, if the acoustic impedance of a first medium is known, the acoustic impedance of a second medium can be determined.

It appears that the intraocular pressure of the eye is responsive to the acoustic impedance of the cornea, and this relationship is constant. A system for measuring the acoustic impedance of the cornea is shown in FIG. 2. In this system the eye is ensonified by bursts of high frequency acoustic energy and the echo level is visually displayed in the face of the cathode ray tube. Simultaneously, the same energy is used to ensonify, through a like interface material, a material whose acoustic impedance is a calibrated variable. The second echo so produced is displayed above the first echo on the same tube face. By adjusting the variable calibrated impedance ($Z_2$) until the echo intensities are equal, a value of $Z_2$ is radiated which is equal to that of the ensonified portion of the eye.

The subject disposes his eyes in a container 100 so that the distance d of the corneas from the right transducer 102 and the left transducer 104 is equal to the distance d' of a body 106, whose acoustic impedance is a calibrated variable, from a transducer 108 in a container 110. Both of the containers are filled with a fluid whose acoustic impedance approximates that of the eye.

A clock pulse generator 112 generates a fixed sequence of pulses which form the time base for the system. Each clock pulse enables a transmitter driver 114 which drives a pulse transmitter to feed a high frequency pulse to two transmit-receive switches 118 and 120. The clock pulses from the generator 112 are also coupled to a logic network 122 which alternatively enables switch 118 and switch 120. Switch 118, when enabled, transmit the high frequency transmitter pulses to either the right or left transducers 102 or 104, as determined by a right or left select circuit 124, which propagates the energy through the medium $Z_1$ contained in the container 100 to the respective right or left corena. The echo returns through the same transducer to the switch 118, which is held on by the logic network 122. The echo is coupled through a receiver 126, amplified in a vertical amplifier 128, and coupled by an alternate vertical deflection circuit 130 to the vertical input of the CRT 132 and displayed as a lower trace. The same clock pulse from the generator 112, which initiated this sequence, turns on a sweep generator 134, which starts the CRT horizontal trace via the sweep amplifier 136 which is coupled to the horizontal input of the CRT. The initial pulse (I) displayed in the CRT is part of the transmit pulse which feeds through the receiver chain. The subsequent pulse (E) is the echo pulse. The sequence is repeated for the next clock pulse from the generator 112 which causes the logic network 122 to turn on the transmit-receive switch 120. This couples the high frequency pulse from the transmitter 116 to the transducer 108 disposed in the standard container 110 which is also filled with the medium $Z_1$. The burst of energy is reflected by the adjustable impedance body 106, and this echo is coupled through the receiver 126, the amplifier 128 and the alternate vertical deflection circuit to the vertical input of the CRT, and displayed as an upper trace. The traces are alternated as described by the alternate deflection circuit which adds a voltage increment to the pulses from the switch 120.

The impedance of the body 106 is adjusted until the echo intensities are matched, thereby providing a known value of $Z_2$ equal to the ensonified portion of the eye $Z_1$.

When the acoustic impedance of the interface material $Z_1$, such as water or light oil, is closely matched to the acoustic impedance of the eye $Z_1$, the coefficient of reflection intensity ($I_r$) is very sensitive to changes in the acoustic impedance of the eye ($Z_2$), thus, $$\frac{I_{rn}}{I_{rg}} = \frac{\left[\frac{Z_1 - Z_n}{Z_1 + Z_n}\right]^2}{\left[\frac{Z_1 - Z_g}{Z_1 + Z_g}\right]^2}$$

where:

$I_{rn}$=intensity of reflection coefficient for a normal eye;
$I_{rg}$=intensity of reflection coefficient for a glaucomatous eye;
$Z_1$=acoustic impedance of the interfaces material;
$Z_n$=acoustic impedance of the normal eye,
$Z_g$=acoustic impedance of the glaucomatous eye.

By letting $A = Z_g/Z_n$, $B = I_{rn}/I_{rg}$, $D = Z_1/Z_n$, thus, $$B = \left[\frac{D-1}{D+1}\right]^2 \times \left[\frac{D+A}{D-A}\right]^2$$

which when plotted, letting said B be the variable, provides a family of curves as a function of D. In these curves, the ratio of coefficient of reflection changes very rapidly for small changes in acoustic impedance of the eye when the initial impedance match is close to 1. This sensitivity decreases as the initial acoustic impedance match is degraded, e.g. D becomes smaller. When the initial acoustic impedance ratio is 0.9, a coefficient of intensity of reflection ratio of 0.5 is obtained by the impedance ratio A changing approximately 0.05. Thus, a 5% change in corneal acoustic impedance between a normal eye and a glaucomatous eye will result in a 6 db change in reflected energy. This level change is a good minimum detectable criteria.

It may be noted that acoustic impedance is the product of density and velocity of sound. Assuming that the cornea does not stretch and that the scleral tissue is totally compressible, then there is a linear relationship between scleral density and intraocular pressure. In this case, velocity being constant, the acoustic impedance of the sclera is directly related to intraocular pressure. Thus, this system has the capability of detecting a 5% change in intraocular pressure.

While there has been shown and described the preferred embodiments of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method of determining the intraocular pressure in the anterior chamber of an invertebrate eye including as a wall of the chamber the cornea comprising:
   disposing the open end of a cup-like member into sealed relationship with the cornea;
   transmitting fluid into the cup-like member under pressure to increase the pressure on the cornea enclosed by the cup-like member;
   sensing the location of the mid-portion of the portion of the cornea enclosed by the cup-like member and detecting the initial incremental deflection of the mid-portion from said location; and
   in response to such detecting of such deflection, indicating the fluid pressure within said cup-like member.

2. A method according to claim 1 wherein the location of the mid-portion of the cornea is determined by measuring the transit time of an acoustic pulse from a transducer within said cup-like member to said mid-portion of said cornea plus the transit time of the echo thereof from the cornea to the transducer.

3. Apparatus for determining the intraocular pressure in the anterior chamber of an invertebrate eye including as a wall of the chamber the cornea comprising:
   a fluid pressure system including,
   a cup-like member having its open end disposed in a sealed relationship with the cornea;
   a source of fluid under pressure;
   control means coupled to and between said cup-like member and said source of fluid for admitting fluid from said source into said cup-like member whereby to progressively increase the fluid pressure within said cup-like member and against the cornea; and
   means for detecting an initial, incremental deflection in the cornea and for providing a signal in response thereto.

4. Apparatus according to claim 3 wherein said detection means comprises;
   a ranging system including a piezoelectric transducer means disposed within said cup-like member for transmitting a series of sonic pulses to the cornea and for receiving the echo pulses therefrom; and
   means for timing the transit time of said pulses and echoes and for detecting a change in said transmit time and for providing a signal in response thereto.

5. Apparatus according to claim 4 further including: means coupled to said ranging system and to said fluid pressure system for indicating the magnitude of the fluid pressure in said cup-like member in response to said signal.

6. Apparatus according to claim 4 wherein said control means is coupled to said ranging system and is adapted to halt the admission of fluid from said source to said cup-like member in response to said signal.

7. Apparatus according to claim 3 wherein said fluid is a gas.

8. Apparatus according to claim 4 wherein said fluid is a gas and further includes a layer of transducer to gas acoustic match material disposed on said transducer at its interface with said gas.

9. Apparatus according to claim 4 wherein at least an annular portion of said cup-like member is of relatively resilient material;
   further including a relatively rigid support means rigidly connected to said transducer means, whereby to maintain said transducer means and the cornea at a constant spacing.

10. Apparatus according to claim 4 wherein:
    said ranging system further includes;
    a pulse transmitter,
    a receiver,
    a variable delay line, and
    a transmit receive switch coupled to said transmitter, receiver, delay line and transducer, for alternatively and cyclically (1) coupling a transmitted pulse from said transmitter to said transducer and to said delay line, (2) coupling the echo pulse of said transmitted pulse to said receiver, and
    means coupled to said receiver and said delay line for comparing the arrival times of said transmitted pulse and respective echo pulse.

References Cited

UNITED STATES PATENTS

| | | | |
|---|---|---|---|
| 2,648,977 | 8/1953 | Mills | 73—52 |
| 2,985,018 | 5/1961 | Williams | 73—398 |
| 3,371,660 | 3/1968 | Carlin | 73—67.8X |
| 3,425,064 | 2/1969 | Carnevale et al. | 73—67.8X |

OTHER REFERENCES

Jones, Instrument Technology I, 1965, p. 102.

RICHARD C. QUEISSER, Primary Examiner

E. J. KOCH, Assistant Examiner